United States Patent
Fox et al.

(10) Patent No.: US 11,069,045 B2
(45) Date of Patent: Jul. 20, 2021

(54) FOOD PREPARATION ASSISTANCE USING IMAGE PROCESSING

(71) Applicant: International Business Machines Corporation, Armonk, NY (US)

(72) Inventors: Jeremy R. Fox, Georgetown, TX (US); Christian Compton, Austin, TX (US); Lisa Seacat DeLuca, Baltimore, MD (US); Trudy L. Hewitt, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 54 days.

(21) Appl. No.: 16/054,398

(22) Filed: Aug. 3, 2018

(65) Prior Publication Data

US 2020/0043156 A1 Feb. 6, 2020

(51) Int. Cl.
| | |
|---|---|
| *G06T 7/00* | (2017.01) |
| *G06K 9/00* | (2006.01) |
| *G08B 21/02* | (2006.01) |
| *G08B 21/04* | (2006.01) |
| *A23L 5/00* | (2016.01) |
| *G06N 20/00* | (2019.01) |
| *G06F 16/951* | (2019.01) |

(52) U.S. Cl.
CPC .............. *G06T 7/0002* (2013.01); *A23L 5/00* (2016.08); *G06F 16/951* (2019.01); *G06K 9/00711* (2013.01); *G06N 20/00* (2019.01); *G08B 21/0202* (2013.01); *G08B 21/0476* (2013.01); *G06K 2009/00738* (2013.01); *G06T 2207/30128* (2013.01)

(58) Field of Classification Search
CPC ................................ G06T 7/0002; G06T 7/04
See application file for complete search history.

(56) References Cited

U.S. PATENT DOCUMENTS

| | | | |
|---|---|---|---|
| 8,359,221 B2 | 1/2013 | Gala | |
| 2005/0273381 A1 | 12/2005 | Thomas | |
| 2010/0121482 A1* | 5/2010 | Jackson | G06Q 10/087 700/217 |
| 2012/0016754 A1 | 1/2012 | Jackson | |

(Continued)

OTHER PUBLICATIONS

O'Neill et al., "Simulating naturalistic instruction: the case for a voice mediated interface for assistive technology for cognition", Journal of Assistive Technologies, 2 (2). ISSN 1754-9450, 2008, pp. 22-31.

(Continued)

*Primary Examiner* — Wen W Huang
(74) *Attorney, Agent, or Firm* — Anthony V. England; Edell, Shapiro & Finnan, LLC (57) ABSTRACT

A computer system monitors food preparation. Images of food preparation by a user are captured via one or more image capture devices disposed within an area containing food preparation items. A food preparation process being performed by the user is determined. Image processing is performed on the captured images to monitor the food preparation process and detect an event. The user is notified of the detected event, and provided information pertaining to the event. Embodiments of the present invention further include a method and program product for monitoring food preparation in substantially the same manner described above.

17 Claims, 5 Drawing Sheets

(56) References Cited

U.S. PATENT DOCUMENTS

| | | | |
|---|---|---|---|
| 2013/0149676 A1* | 6/2013 | Tokuda | G09B 19/00 434/127 |
| 2013/0260345 A1 | 10/2013 | Puri et al. | |
| 2014/0241571 A1* | 8/2014 | Bilet | G06K 9/00342 382/103 |
| 2017/0221296 A1* | 8/2017 | Jain | G07F 11/165 |
| 2018/0048481 A1 | 2/2018 | Wann et al. | |
| 2018/0218219 A1* | 8/2018 | Kubotani | G06K 9/00671 |
| 2018/0324908 A1* | 11/2018 | Denker | H05B 6/6435 |

OTHER PUBLICATIONS

Bonanni et al., "CounterIntelligence: Augmented Reality Kitchen", CHI 2005, Portland, Oregon, vol. 2239, Apr. 2005, 7 pages.

Kranz et al., "Sensing Technologies and the Player-Middleware for Context-Awareness in Kitchen Environments" Networked Sensing Systems, INSS'07. Fourth International Conference on IEEE, 2007, 8 pages.

Castellanos, "Virtual cooking assistant app SousChef aims to be the 'go-to cooking app' for Google Glass", https://www.bizjournals.com/boston/blog/startups/2014/04/virtual-cooking-assistant-app-souschef-aims-to-be.html, Apr. 22, 2014, 2 pages.

Murnane, "Google's New Approach to Glass Could be the Killer App for Augmented Reality", https://www.forbes.com/sites/kevinmurnane/2017/07/24/googles-new-approach-to-glass-could-be-the-killer-app-for-augmented-reality/#18a08da06ea0, Jul. 24, 2017, 8 pages.

Bierce, "Suck at Cooking? Pinterest's Computer Vision Can Help", Wired, https://www.wired.com/2017/05/suck-cooking-pinterests-computer-vision-can-help/, May 2017, 8 pages.

Lardinois, "Cooking with Google Home just got easier", https://techcrunch.com/2017/04/26/cooking-with-google-home-just-got-easier/, Apr. 2017, 6 pages.

Komando, "Alexa can assist you with cooking brand new recipes", USA Today, http://www.msn.com/en-us/money/technology/alexa-can-assist-you-with-cooking-brand-newrecipes/ar-AApqPXU, Aug. 4, 2017, 5 pages.

Albright, The Plate, How Google Glass Will Change the Way You Cook, National Geographic, https://www.nationalgeographic.com/people-and-culture/food/the-plate/2014/08/04/how-google-glass-will-change-the-way-you-cook/, Aug. 4, 2014, 16 pages.

Nest Protect, The smoke alarm that thinks, speaks and alerts your phone, https://nest.com/smoke-co-alarm/meet-nest-protect/, Nest CO whitepaper, Jun. 2014, 11 pages.

* cited by examiner

FOOD PREPARATION ASSISTANCE USING IMAGE PROCESSING

BACKGROUND

1. Technical Field

Present invention embodiments relate to image processing, and more specifically, to providing food preparation assistance using image processing.

2. Discussion of the Related Art

Food preparation refers to the act of preparing food for consumption, and may include a wide range of methods, tools, and combinations of ingredients. Typically, the goal of preparing food is to produce a finished product that is consistent, appealing, and safe for consumption. Whether food is being prepared at home or in a commercial environment, the same fundamentals guide food preparation, such as not overcooking or undercooking items, applying an appropriate amount of seasoning, and avoiding cross-contamination in the kitchen.

Food safety can be a concern, especially for novice cooks who are attempting a recipe for the first time. For example, an amateur cook may not correctly follow or adhere to food safety guidelines. Furthermore, even professional cooks may inadvertently make mistakes while preparing food in busy commercial environments like the kitchens of restaurants and cafeterias.

SUMMARY

According to one embodiment of the present invention, a computer system monitors food preparation. Images of food preparation by a user are captured via one or more image capture devices disposed within an area containing food preparation items. A food preparation process being performed by the user is determined. Image processing is performed on the captured images to monitor the food preparation process and detect an event. The user is notified of the detected event, and provided information pertaining to the event. Embodiments of the present invention further include a method and program product for monitoring food preparation in substantially the same manner described above.

BRIEF DESCRIPTION OF THE DRAWINGS

Generally, like reference numerals in the various figures are utilized to designate like components.

DETAILED DESCRIPTION

Present invention embodiments relate generally to image processing, and more specifically, to providing food preparation assistance using image processing. Whether food is prepared at home or in a commercial setting, it is important to follow the steps of a recipe while adhering to food safety guidelines in order to produce results that are both appetizing and safe for consumption. While a user cooks, the user can be monitored using a camera, and image processing techniques extract data that can be further analyzed to provide assistance to the user during the food preparation process. For example, the user can be warned of food safety issues, such as undercooked food or presence of allergens. The user can also be provided with helpful suggestions regarding the user's cooking techniques, such as how to perform a particular technique or how to properly season a dish. Thus, feedback and suggestions can be generated to assist users who are inexperienced and to warn of dangers. Furthermore, recommendations can be updated by applying machine learning to crowdsourced data to continually improve suggestions.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Figure 1:
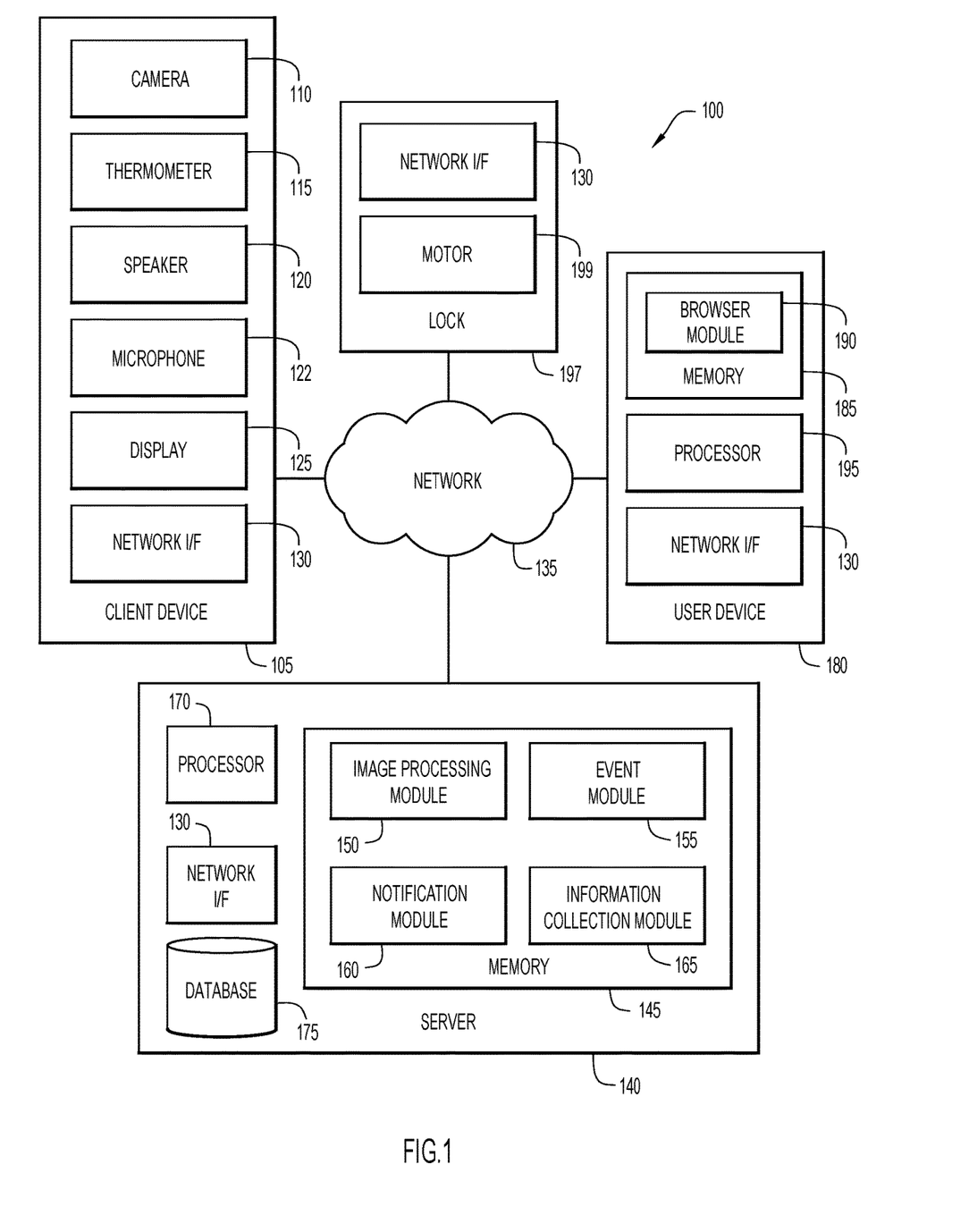
FIG. 1 is a block diagram depicting a computing environment for providing food preparation assistance using image processing in accordance with an embodiment of the present invention.

Present invention embodiments will now be described in detail with reference to the Figures. FIG. 1 is a block diagram depicting a computing environment 100 for providing food preparation assistance using image processing in accordance with an embodiment of the present invention. As depicted, computing environment 100 includes a client device 105, a server 140, a user device 180, and a lock 197. It is to be understood that the functional division among components of computing environment 100 have been chosen for purposes of explaining the present invention and is not to be construed as a limiting example.

Client device 105 includes a camera 110, a thermometer 115, a speaker 120, a microphone 122, a display 125, and a network interface 135. In various embodiments of the present invention, client device 105 may include a laptop computer, a tablet computer, a netbook computer, a personal computer (PC), a desktop computer, a personal digital assistant (PDA), a smart phone, a thin client, or any programmable electronic device capable of executing computer readable program instructions. Client device 105 may be positioned in a food preparation area so that camera 110 and thermometer 115 can properly collect data regarding the food preparation process. In some embodiments, camera 110, thermometer 115, speaker 120, and/or display 125 may be situated in multiple separate modules in order to facilitate unhindered observation of the food preparation process and to provide clear feedback to a user. Network interface 130 enables components of client device 105 to send and receive data over a network, such as network 135. Client device 105 may include internal and external hardware components, as depicted and described in further detail with respect to FIG. 5.

Camera 110 may be any conventional or other image capture device capable of still photography and/or videography. Camera 110 may be positioned in a vantage point to provide an unobscured view of a user preparing food in one or more locations of a food preparation area. For example, camera 110 may be placed in proximity to a range, an oven, a countertop, and the like. In some embodiments, camera 110 is provided with a motor in order to track a user throughout a food preparation area by tilting and panning accordingly. In some embodiments, camera 110 is a forward-looking infrared (FLIR) camera that can detect excessive heat in portions of a food preparation area.

Thermometer 115 may include any instrument for measuring temperature. Thermometer 115 may be a food probe that can be inserted into a food item or a heating medium (e.g., water, oil, or air) in order to measure a temperature of the food item or heating medium. In some embodiments, thermometer 115 is an infrared thermometer capable of measuring a surface temperature of a target remotely. Speaker 120 may include any transducer capable of converting an electrical signal to sound, and microphone 122 may include any transducer capable of converting sound to an electrical signal. In some embodiments, client device uses speaker 120 and microphone 122 to provide a digital assistant feature to a user in the food preparation area. Display 125 may include any output device for presenting information in a visual form, such as a liquid crystal display (LCD) or a light-emitting diode (LED) display.

Network 135 may include a local area network (LAN), a wide area network (WAN) such as the Internet, or a combination of the two, and includes wired, wireless, or fiber optic connections. In general, network 135 can be any combination of connections and protocols that will support communications between client device 105, server 140, user device 180, and/or lock 197 in accordance with embodiments of the present invention.

Server 140 includes a network interface 130, at least one processor 170, a database 175, and memory 145. In general, server 140 and its modules analyze a user's food preparation process in order to provide assistance and intelligent feedback. Server 140 may also employ machine learning techniques to improve feedback and food preparation instructions to a user, which can be augmented using crowdsourced data and other third-party data. Client device 105 may share data with server 140 and its modules, including any data gathered from camera 110, thermometer 115, or microphone 122. Server 140 may include internal and external hardware components, as depicted and described in further detail with respect to FIG. 5.

Image processing module 150, event module 155, notification module 160, and information collection module 165 may include one or more modules or units to perform various functions of present invention embodiments described below. Image processing module 150, event module 155, notification module 160, and information collection module 165 may be implemented by any combination of any quantity of software and/or hardware modules or units, and may reside within memory 145 of server 140 for execution by a processor, such as processor 170.

Image processing module 150 may perform various conventional or other image processing techniques on images captured by camera 110 to actively monitor the preparation of food. Image processing module 150 may analyze images of a food preparation area to identify food items, utensils, and devices associated with food preparation. For example, image processing module 150 may identify food items such as raw or cooked meats, fruits, vegetables, pastas, dairy products, baking ingredients, seasonings, condiments, water, oils, juices, extracts, eggs, nuts, fungi, cereals, and any other food item that is edible or can be prepared for human consumption. Image processing module 150 may also identify items and utensils associated with food preparation, such as bowls, knives, cutlery, whisks, ladles, tongs, mashers, presses, colanders, mortars and pestles, corers, brushes, blenders, food processors, dry and liquid measuring cups, plates, cutting boards, ovens, toasters, ranges, immersion circulators, fryers, grills, trays, pots, pans, and the like.

Image processing module 150 may identify food items, utensils, and devices using machine learning techniques. Image processing module 150 may employ various models to perform the learning (e.g., neural networks, mathematical/statistical models, classifiers, etc.). Image processing module 150 may be trained using supervised or unsupervised learning. Thus, image processing module 150 may be trained to identify any sort of food item, utensil, and/or device associated with any food preparation process.

Event module 155 may detect events relating to food preparation. Event module 155 may analyze the combination of food items, utensils, and/or devices identified by image processing module 150 to determine events related to the food that is being prepared. Event module 155 may monitor a food preparation area having one or more users cooking simultaneously, and may individually track separate users performing unrelated food preparation tasks in a shared workspace. Event module 155 may determine suggestions based on events that occur during the food preparation process. Event module 155 may determine events by applying machine learning techniques to the food items, utensils, and devices that are observed in a food preparation area. Event module 155 may employ various models to perform the learning (e.g., neural networks, mathematical/statistical models, classifiers, etc.), and may be trained using crowdsourced data and user feedback to assist in matching a user's preferences, such as flavor profile, doneness, texture preferences, and the like. Event module 155 may analyze data from a population of users and classify characteristics of food preparation items within the data to correlate classifications to resulting prepared food, and may adjust recommendations accordingly to assist a user in preparing food based on the correlations and the environment of the user. The suggestions of event module 155 may be modified, using machine learning techniques, to achieve desired outcomes for each particular user. Additionally or alternatively, event module 155 may receive information from a user regarding the food preparation being performed. For example, a user of user device 180 may browse to a recipe website and may inform server 140 that the user is following a particular recipe; event module 155 may then ingest the recipe being followed. A user may also verbally provide information to event module 155 via microphone 122 of client device 105.

For example, if image processing module 150 determines that there is a raw steak in a pan that is on a burner set to high heat, then event module 155 may determine that the event that is occurring is the cooking of a steak. Event module 155 may then determine a suggestion, such as to flip the steak after the steak has been cooking for a certain amount of time. The amount of time to cook one side of the steak may be determined according to the user's preference of doneness (e.g., rare, medium well, etc.), which can be determined according to user input either by the user's explicit request, or as determined by previous user feedback.

Event module 155 may ensure that a user follows a recipe or food preparation technique correctly. For example, using data processed by image processing module 150, event module 155 may detect events that represent a deviation from a correct food preparation process. For example, if a user omits a step in a recipe, event module 155 may recognize that the step was omitted and generate a notification to remind the user.

Event module 155 may detect events that correlate to food safety and other hazards in the food preparation area. With image processing module 150 processing images over time to track raw ingredients in a food preparation area, event module 155 can determine that a cross-contamination event has occurred. For example, event module 155 may detect when cooked poultry has been placed on a cutting board that was previously occupied by raw poultry and has not been sanitized, and issue a warning accordingly. Event module 155 may also detect when food is inadequately cooked, either by monitoring the amount of time that the food item has cooked at a particular level of heat, or by using data from thermometer 115. For example, roasting a turkey for thirty minutes at three hundred fifty degrees Fahrenheit may not be enough of a cook time to adequately ensure that the turkey has achieved a safe internal temperature. Similarly, event module 155 may detect an event corresponding to spoilage of food, such as exposing food for too long to an environment that falls within the temperature range in which food-borne bacteria can grow. For example, if event module 155 determines that a particular food item has been stored at an improper temperature for too long of a duration, a user may be advised to discard the food item. Event module 155 may also track the cumulative amount of time that a food item has been stored improperly. In some embodiments, event module 155 detects events related to improper food storage and/or handling in a busy food preparation area, such as a commercial kitchen that has multiple cooks.

Event module 155 may detect events that correlate to the inclusion of an allergen during food preparation. For example, a user may indicate, via client device 105 or user device 180, one or more allergens that should be avoided during food preparation; if event module 155 determines the presence of the allergen in the food preparation area, then event module 155 may issue a warning. In some embodiments, event module 155 may detect events relating to food recalls. For example, if information collection module 165 has determined that there is a food recall for spinach in the user's region, then event module 155 may detect any food preparation event involving spinach so that a user may be issued a warning accordingly.

Event module 155 may also analyze data from camera 110, thermometer 115, and image processing module 150 to detect events corresponding to hazards in a food preparation area. By analyzing data from camera 110 and/or image processing module 150, event module 155 may detect pots that are boiling over, food that is burning, presence of smoke or water spills, refrigerators or freezers left open, burners left on and unoccupied, presence of metals in a microwave oven, and the like. By analyzing data from thermometer 115, event module 155 may detect excessive heat being applied to a food item or a cooking vessel. Once a hazardous event is detected by event module 155, a warning may be issued to any user in the food preparation area. Event module 155 may detect events in which an unsupervised child is present in the food preparation area, and issue instructions to lock 197 to lock the corresponding appliance or cabinet. Children may be identified as such by image processing module 150 using conventional or other facial recognition technology combined with other data gathered from image processing module 150, such as the height and gait of an individual.

Notification module 160 may send notifications to a user relating to events detected by event module 155. In some embodiments, notification module 160 sends the notification to client device 105 via network 135. Client device 105 may present a notification to a user in a food preparation area using speaker 120. Client device 105 may employ text-to-speech techniques to play a notification in a user's language of choice. Alternatively or additionally, client device 105 may visually notify a user by presenting a notification on display 125. Notification module 160 may send a notification to user device 180.

Information collection module 165 may search one or more network-accessible locations to collect information relating to food safety recalls. Information collection module 165 may search news publications, databases that track food outbreaks, and other sources of food safety information to determine if there have been any advisories issued that may affect a user preparing food. In some embodiments, information collection module 165 searches for food safety information that is relevant to a user's location and/or a location where the user has sourced ingredients. Information collection module 165 may be provided with a user's location via user device 180 or by client device 105; in some embodiments, a user manually provides their location to server 140.

Database 175 may include any non-volatile storage media known in the art. For example, database 175 can be implemented with a tape library, optical library, one or more independent hard disk drives, or multiple hard disk drives in a redundant array of independent disks (RAID). Similarly, data on database 175 may conform to any suitable storage architecture known in the art, such as a file, a relational database, an object-oriented database, and/or one or more tables. Server 140 may store on database 175 any data associated with a user, such as the user's food preparation preferences, data from previous food preparation sessions, user feedback, and the like.

User device 180 includes a network interface 130 and memory 185 with browser module 190. In various embodiments of the present invention, user device 180 may include a laptop computer, a tablet computer, a netbook computer, a personal computer (PC), a desktop computer, a personal digital assistant (PDA), a smart phone, a thin client, or any programmable electronic device capable of executing computer readable program instructions. A user may interact with user device 180 to provide information to server 140, such as the user's location, allergen information, food preferences, recipes, and the like. User device 180 may include internal and external hardware components, as depicted and described in further detail with respect to FIG. 5.

Browser module 190 may include any application for retrieving, presenting, and traversing documents that are accessible over a network, such as an intranet or the World Wide Web. A user of user device 180 may use browser module 190 to access and browse websites. A user may browse to a web site having one or more recipes to share a recipe that the user is preparing with client device 105 and/or server 140. Browser module 190 may include any conventional or other web browser software.

Lock 197 includes a network interface 130 and a motor 199. In some embodiments, lock 197 is an Internet-of-Things enabled locking device. Lock 197 may be incorporated into any conventional or other cabinet, drawer, door, oven, microwave, freezer, refrigerator, and the like. When event module 155 determines that a child is unsupervised in a food preparation area, lock 197 may receive instructions from event module 155 via network interface 130 to lock. Motor 199 may then cause lock 197 to move into a locked position, preventing the child from opening the container or appliance with which lock 197 is associated. Motor 199 may include any conventional or other motor, such as a linear actuator. In some embodiments, lock 197 may be a motor-less electromagnetic lock that is engaged or disengaged by application of an electric current. When a child is no longer present, the container or appliance may be unlocked.

Figure 2:
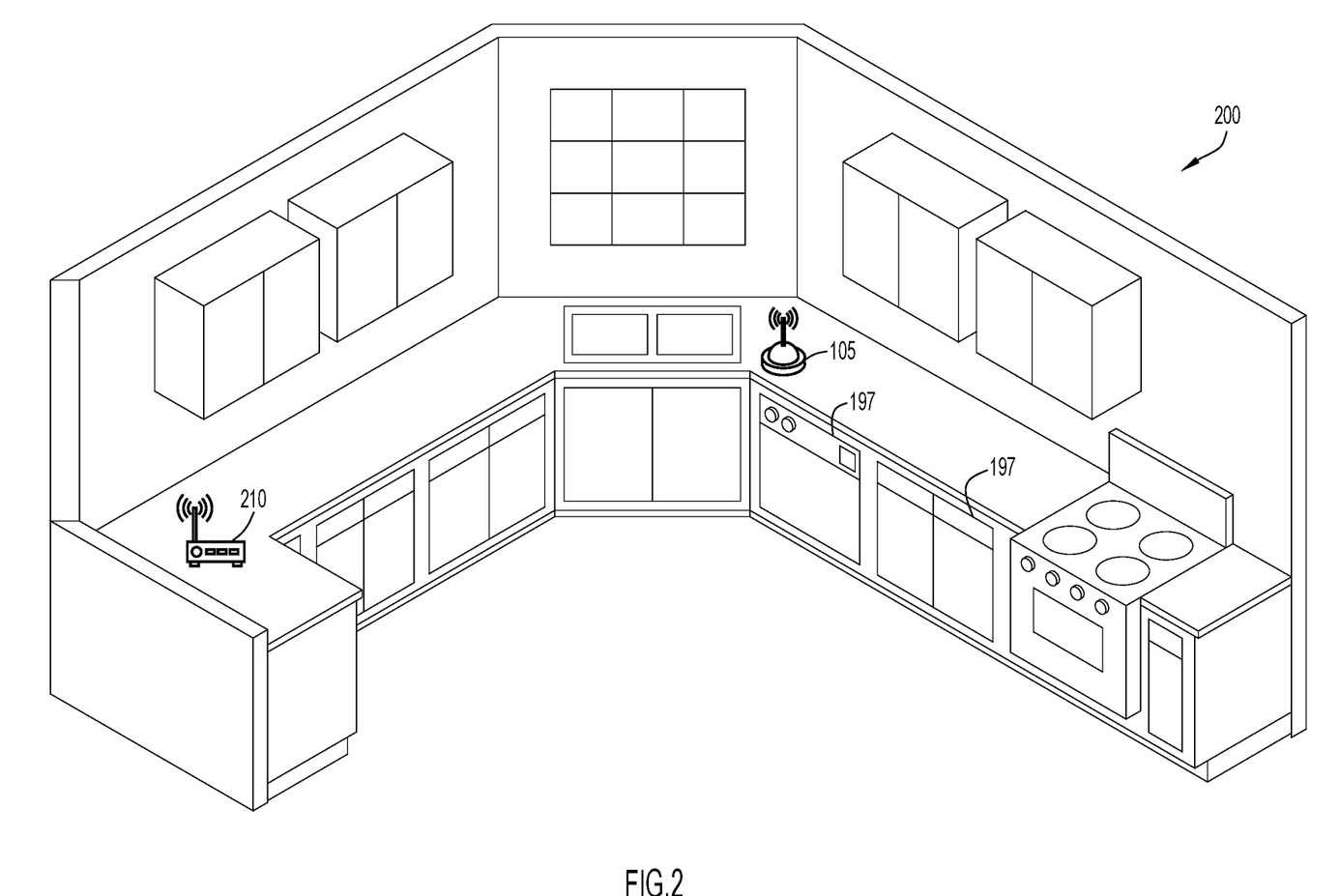
FIG. 2 is an example of a food preparation area in accordance with an embodiment of the present invention.

FIG. 2 is an example of a food preparation area 200 in accordance with an embodiment of the present invention. As depicted, food preparation area 200 includes a client device 105, locks 197, and an access point 210. Client device 105 may be placed in a food preparation area 200 in any location that enables client device 105 to gather data relating to the food preparation process. For example, client device 105 may be positioned in a location that enables camera 110, thermometer 115, and microphone 122 to gather information from food preparation area 200.

Client device 105 may connect to an access point, such as access point 210, to wirelessly transmit data over a network, such as network 135, in order to communicate with server 140, user device 180, and locks 197. Each lock 197 may be associated with a container or appliance; in the depicted example, a cabinet and a dishwasher each have a lock 197.

Figure 3:
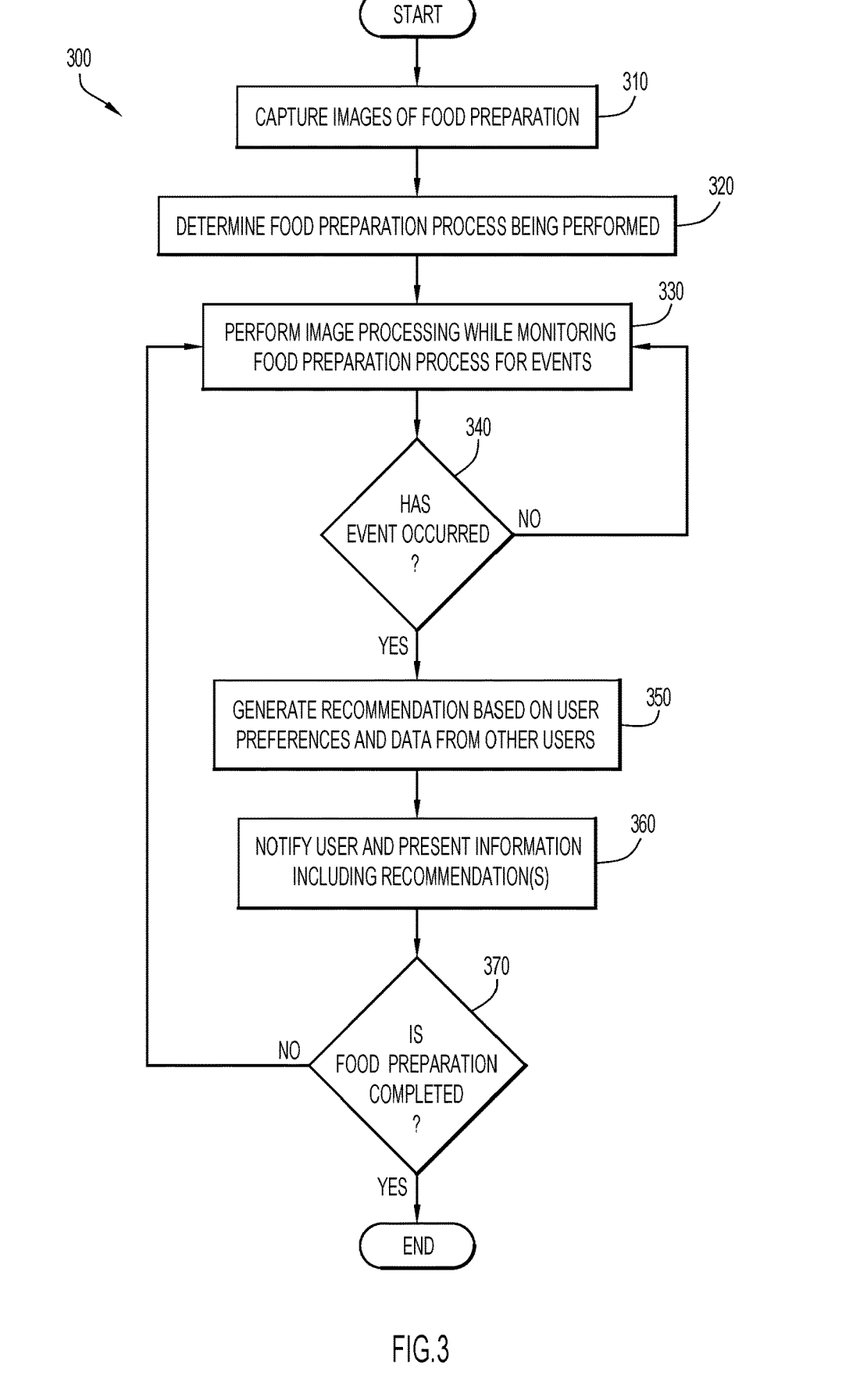
FIG. 3 is a flow chart depicting a method of providing food preparation assistance using image processing in accordance with an embodiment of the present invention.

FIG. 3 is a flow chart depicting a method 300 of providing food preparation assistance using image processing in accordance with an embodiment of the present invention.

Images of food preparation are captured at operation 310. Camera 110 of client device 105 may take images of a food preparation area when a user begins preparing food. The images may be sent to server 140 for processing by image processing module 150, which determines the food items, utensils, and devices that are in the food preparation area. Camera 110 continuously shares images of the food preparation area with server 140 during a user's food preparation process, which are processed in live time in order to provide timely feedback for each step of food preparation.

The food preparation process being performed is determined at operation 320. The user may verbally interact with client device 105 via microphone 122 to provide information detailing the food preparation process being performed. Alternatively or additionally, a user may interact with user device 180 to provide information regarding the food preparation process. The user may provide information relating to a recipe, such as a list of ingredients, an amount of ingredients, suggested preparation times, and a series of steps outlining the food preparation process. In some embodiments, event module 155 ingests a recipe using natural language processing and machine learning techniques to determine the steps of the recipe. If a user does not provide sufficient information regarding the food being prepared, event module 155 may monitor the user's techniques without any specific template while providing feedback for any cooking techniques being performed.

Image processing is performed while monitoring the food preparation process for events at operation 330. As a user prepares food, the user's interaction with the food preparation area is actively monitored in order to detect one or more events relating to food preparation. Image processing module 150 processes images of the food preparation process to determine which actions the user is performing, and event module 155 determines whether any of the actions correspond to an event. Event module 155 may detect multiple simultaneous events occurring in a food preparation area having multiple cooks.

Operation 340 determines whether an event has occurred. Event module 155 may analyze data collected from image processing module 155 for events. For example, image processing module 150 may determine that a user is sautéing vegetables, and event module 155 may monitor the cooking vegetables to determine that the vegetables are at risk of being overcooked. Thus, event module 155 determines that an overcooking event is occurring, and may generate a recommendation that suggests to the user to stop cooking the vegetables. Other events may include determining that there is a hazard in the food preparation area, determining that a user is incorrectly performing a particular food preparation technique, determining whether a food item is overcooked or undercooked, determining whether there is any cross-contamination in the food preparation area, determining whether any allergens were present in the food preparation process, determining whether the user has diverged from a selected recipe, and determining whether any food items were mishandled (e.g., dropped on the floor, etc.).

A recommendation is generated based on user preferences and data from other users at operation 350. The recommendation may include a tip or suggestion to rectify an improper food preparation technique performed by the user. By analyzing a user's feedback from previous food preparation sessions, recommendations can be personalized for the user. For example, a user may prefer a particular flavor profile, doneness, texture, or presentation options for food that is prepared. Crowdsourced data may be collected to provide insights into the characteristics of appliance brands and ingredients. For example, if a user's microwave has a particularly low wattage, a recommendation may be generated based on other users' experiences to alter a microwaving step in a recipe to extend the cooking time. Similarly, if certain ingredients are known to present particular issues, a user can be advised of changes to a recipe. For example, if a particular brand of spice is especially potent, a recommendation may be generated that advises the user to use only half as much of the spice. Thus, recommendations may be adjusted according to a specific user and/or to a specific food preparation area according to previously-gathered data.

The user is notified of the event and presented with information including a recommendation at operation 360. The user may be notified via speaker 120, display 125 and/or via a notification to user device 180. A user may also be presented with feedback relating to their food preparation process. By comparing a user's present food preparation session to previous sessions, and to sessions of other users, the user can be presented with meaningful statistics and benchmarks regarding the user's adherence to food safety guidelines.

User feedback may also be monitored. For example, a user may accept a suggestion by issuing a voice command to client device 105, or by simply performing the recommended activity or technique, which is then detected using image processing. Similarly, a user may reject a suggestion by overtly disregarding the suggestion. For example, a user may add more of a spicy seasoning after being warned that further addition of the seasoning may result in especially spicy food. A user may also retry a suggestion if the user inadvertently rejected the suggestion.

Operation 370 determines whether the food preparation is complete. If the user has completed the last step of the food preparation process, then client device 105 may stop monitoring the food preparation area. If there are additional steps left in the food preparation process, method 200 returns to operation 330 to monitor for the next event.

Figure 4:
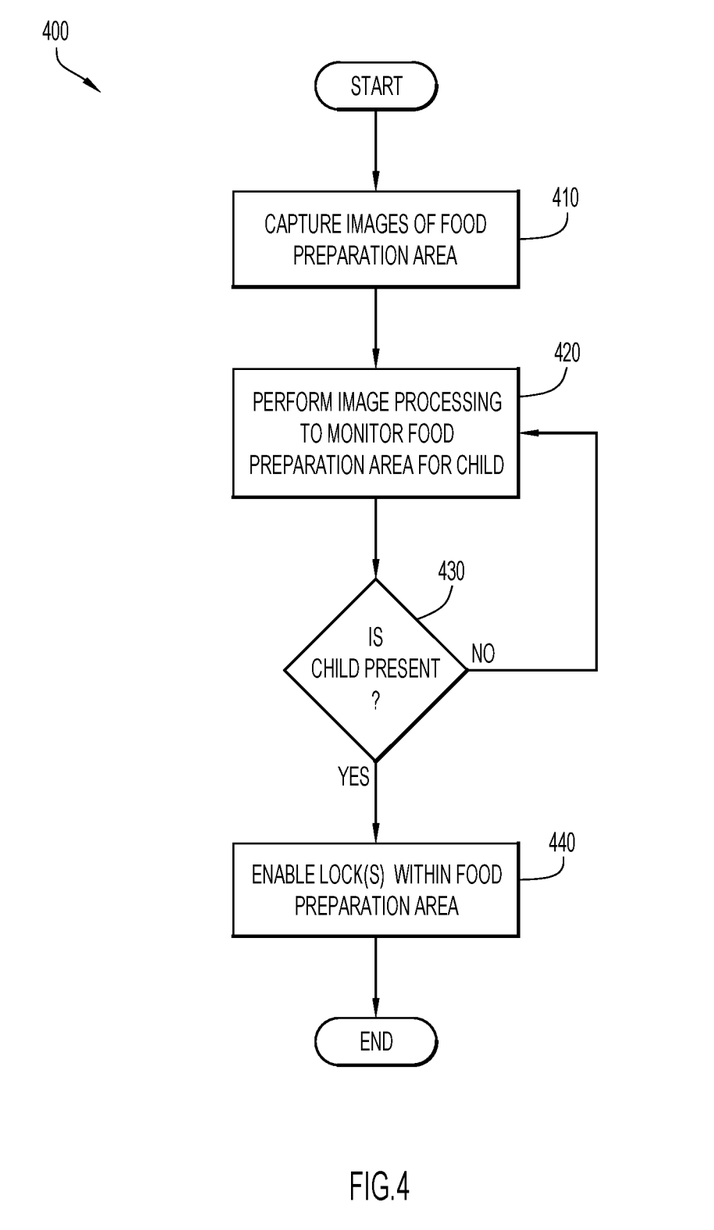
FIG. 4 is a flow chart depicting a method of safeguarding a food preparation area in accordance with an embodiment of the present invention.

FIG. 4 is a flow chart depicting a method 400 of safeguarding a food preparation area in accordance with an embodiment of the present invention.

Images of the food preparation area are captured at operation 410. Camera 110 of client device 105 may continuously take images of a food preparation area, which are sent to server 140 for processing by image processing module 150.

Image processing is performed to monitor the food preparation area for the presence of a child at operation 420. Image processing module 150 may process the images to determine whether there are any children in the food preparation area. Image processing module 150 may identify children using conventional or other facial recognition technology, by determining that an individual is below a certain height, and/or by analyzing the individual's movement for crawling or gaits associated with toddlers.

Operation 430 determines whether an event has occurred. If a child is present, then method 400 proceeds to operation 440 to activate locks in the food preparation area. In some embodiments, the presence of an adult accompanying the child may serve as an override to prevent the locks from being activated.

Locks within the food preparation area are enabled at operation 440. Client device 105 may issue a command to any locks 197 in the food preparation area to cause the locks to activate. Thus, a child is prevented from accessing a hazard such as an active oven or a knife drawer. In some embodiments, locks are disengaged once the child is no longer present in the food preparation area.

Figure 5:
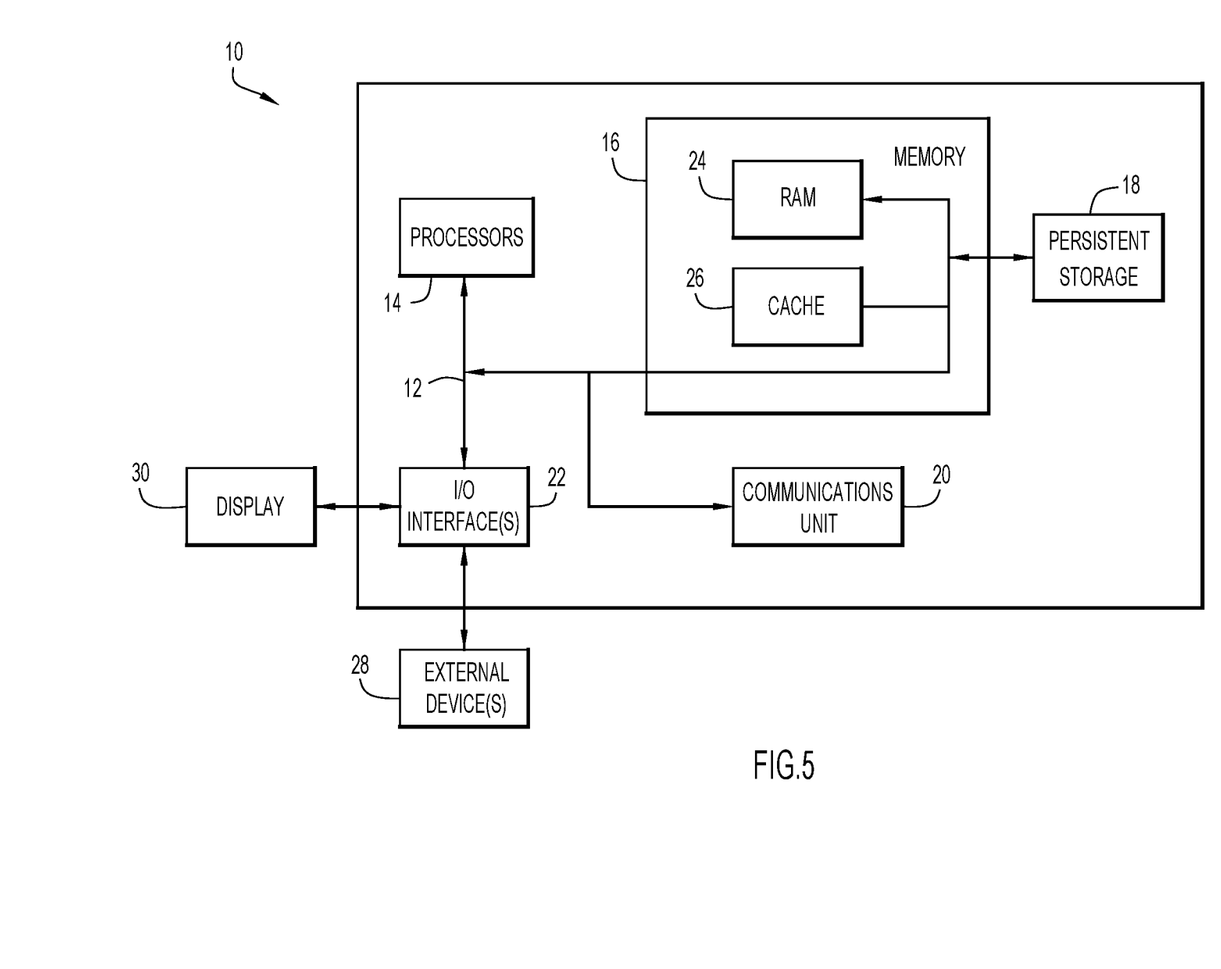
FIG. 5 is a block diagram depicting a computing device in accordance with an embodiment of the present invention.

FIG. 5 is a block diagram depicting components of a computer 10 suitable for executing the methods disclosed herein. Computer 10 may implement client device 105, server 140, and/or user device 180 in accordance with embodiments of the present invention. It should be appreciated that FIG. 5 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to food preparation (e.g., food preparation data, user preference data, recipe data, image data, user feedback data, crowdsourced data, event data, notification data, food safety data, etc.) may be stored within any conventional or other data structures (e.g., files, arrays, lists, stacks, queues, records, etc.) and may be stored in any desired storage unit (e.g., database, data or other repositories, queue, etc.) The data transmitted between client device 105, server 140, user device 180, and/or lock 197 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to food preparation (e.g., food preparation data, user preference data, recipe data, image data, user feedback data, crowdsourced data, event data, notification data, food safety data, etc.), may include any information provided to, or generated by, client device 105, server 140, user device 180, and/or lock 197. Data relating to food preparation may include any desired format and arrangement, and may include any quantity of any types of fields of any size to store any desired data. The data relating to food preparation may include any data collected about entities by any collection means, any combination of collected information, and any information derived from analyzing collected information.

The present invention embodiments may employ any number of any type of user interface (e.g., Graphical User Interface (GUI), command-line, prompt, etc.) for obtaining or providing information (e.g., user feedback data, recipe data, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of providing food preparation assistance using image processing.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, server software, communications software, image processing module 150, event module 155, notification module 160, information collection module 165, machine learning software, etc.). These systems may include any types of monitors and input devices (e.g., keyboard, mouse, voice recognition, etc.) to enter and/or view information.

It is to be understood that the software (e.g., browser software, server software, communications software, image processing module 150, event module 155, notification module 160, information collection module 165, machine learning software, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., browser software, server software, communications software, image processing module 150, event module 155, notification module 160, information collection module 165, machine learning software, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to food preparation assistance). The database system may be implemented by any number of any conventional or other databases, data stores or storage structures (e.g., files, databases, data structures, data or other repositories, etc.) to store information (e.g., data relating to food preparation assistance). The database system may be included within or coupled to the server and/or client systems. The database systems and/or storage structures may be remote from or local to the computer or other processing systems, and may store any desired data (e.g., data relating to food preparation assistance).

The present invention embodiments may employ any number of any type of user interface (e.g., Graphical User Interface (GUI), command-line, prompt, etc.) for obtaining or providing information (e.g., data relating to food preparation assistance), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method of monitoring food preparation comprising:
   capturing images of food preparation by a user via one or more image capture devices disposed within an area containing food preparation items;
   determining, via a processor, a food preparation process being performed by the user, wherein determining the food preparation process comprises identifying a plurality of steps for preparing a food item according to the food preparation process, the plurality of steps including a seasoning step;
   performing, via the processor, image processing on the captured images to monitor the food preparation process and detect an event;
   notifying the user of the detected event, via the processor, and provide information pertaining to the event;
   receiving feedback from the user pertaining to food preparation; and
   utilizing a trained machine learning model to learn user preferences and adjust recommendations to the user to perform a step of the plurality of steps for preparing the food item according to the learned user preferences, wherein adjusting the recommendations includes recommending using a different amount of an ingredient from the amount indicated in a step of the plurality of steps for preparing the food item.

2. The computer-implemented method of claim 1, wherein determining a food preparation process further comprises:
   performing image processing on the captured images to determine the food preparation process being performed.

3. The computer-implemented method of claim 1, wherein the event pertains to a safety issue, and the information pertaining to the event includes one or more operations to resolve the safety issue.

4. The computer-implemented method of claim 1, further comprising:
   aggregating data pertaining to the food preparation process performed by the user; and
   comparing the aggregated data to prior food preparation processes to determine feedback for the user.

5. The computer-implemented method of claim 1, further comprising:
   receiving data from a population of users and classifying characteristics of food preparation items within the data to correlate classifications to resulting prepared food; and
   adjusting recommendations to the user to prepare food based on the correlations and corresponding environment of the user.

6. The computer-implemented method of claim 1, further comprising:
   enabling locks of one or more from a group of storage items and appliances within the area in response to occurrence of predetermined conditions.

7. A computer system for monitoring food preparation, the computer system comprising:
   one or more computer processors;
   one or more computer readable storage media;
   program instructions stored on the one or more computer readable storage media for execution by at least one of the one or more computer processors, the program instructions comprising instructions to:
   capture images of food preparation by a user via one or more image capture devices disposed within an area containing food preparation items;
   determine a food preparation process being performed by the user, wherein determining the food preparation process comprises identifying a plurality of steps for preparing a food item according to the food preparation process, the plurality of steps including a seasoning step;
   perform image processing on the captured images to monitor the food preparation process and detect an event;
   notify the user of the detected event, and provide information pertaining to the event;
   receive feedback from the user pertaining to food preparation; and
   utilize a trained machine learning model to learn user preferences and adjust recommendations to the user to perform a step of the plurality of steps for preparing the food item according to the learned user preferences, wherein adjusting the recommendations includes recommending using a different amount of an ingredient from the amount indicated in a step of the plurality of steps for preparing the food item.

8. The computer system of claim 7, wherein the instructions to determine a food preparation process further comprise instructions to:
   perform image processing on the captured images to determine the food preparation process being performed.

9. The computer system of claim 7, wherein the event pertains to a safety issue, and the information pertaining to the event includes one or more operations to resolve the safety issue.

10. The computer system of claim 7, further comprising instructions to:
    aggregate data pertaining to the food preparation process performed by the user; and
    compare the aggregated data to prior food preparation processes to determine feedback for the user.

11. The computer system of claim 7, further comprising instructions to:

receive data from a population of users and classifying characteristics of food preparation items within the data to correlate classifications to resulting prepared food; and adjust recommendations to the user to prepare food based on the correlations and corresponding environment of the user.

12. The computer system of claim 7, further comprising instructions to:

enable locks of one or more from a group of storage items and appliances within the area in response to occurrence of predetermined conditions.

13. A computer program product for monitoring food preparation, the computer program product comprising one or more computer readable storage media collectively having program instructions embodied therewith, the program instructions executable by a computer to cause the computer to:

capture images of food preparation by a user via one or more image capture devices disposed within an area containing food preparation items;

determine a food preparation process being performed by the user, wherein determining the food preparation process comprises identifying a plurality of steps for preparing a food item according to the food preparation process, the plurality of steps including a seasoning step;

perform image processing on the captured images to monitor the food preparation process and detect an event;

notify the user of the detected event, and provide information pertaining to the event;

receive feedback from the user pertaining to food preparation; and utilize a trained machine learning model to learn user preferences and adjust recommendations to the user to perform a step of the plurality of steps for preparing the food item according to the learned user preferences, wherein adjusting the recommendations includes recommending using a different amount of an ingredient from the amount indicated in a step of the plurality of steps for preparing the food item.

14. The computer program product of claim 13, wherein the instructions to determine a food preparation process further comprise instructions to:

perform image processing on the captured images to determine the food preparation process being performed.

15. The computer program product of claim 13, wherein the event pertains to a safety issue, and the information pertaining to the event includes one or more operations to resolve the safety issue.

16. The computer program product of claim 13, further comprising instructions to:

aggregate data pertaining to the food preparation process performed by the user; and compare the aggregated data to prior food preparation processes to determine feedback for the user.

17. The computer program product of claim 13, further comprising instructions to:

enable locks of one or more from a group of storage items and appliances within the area in response to occurrence of predetermined conditions.

* * * * *